United States Patent [19]

Kanezashi et al.

[11] Patent Number: 4,914,831
[45] Date of Patent: Apr. 10, 1990

[54] ROTATION DETECTING APPARATUS

[75] Inventors: Takanobu Kanezashi, Kawasaki; Kazuo Kato, Hamura, both of Japan

[73] Assignee: Casio Computer Co., Ltd., Tokyo, Japan

[21] Appl. No.: 315,526

[22] Filed: Feb. 24, 1989

[30] Foreign Application Priority Data

Mar. 4, 1988 [JP] Japan .............................. 63-28207[U]
May 21, 1988 [JP] Japan .............................. 63-67318[U]

[51] Int. Cl.⁴ .............................................. G01B 7/02
[52] U.S. Cl. ..................................................... 33/780
[58] Field of Search ................. 33/772, 773, 780, 775, 33/774, 776, 777, 778, 779, 781, 782

[56] References Cited

U.S. PATENT DOCUMENTS

| | | | |
|---|---|---|---|
| 2,821,782 | 2/1958 | Kallweit | 33/776 |
| 3,494,039 | 2/1970 | Porter | 33/782 |
| 3,732,623 | 5/1973 | Bopst | 33/779 |
| 3,791,038 | 2/1974 | Polydoris et al. | 33/780 |
| 3,921,301 | 11/1975 | Tuley | 33/780 |
| 3,999,298 | 12/1976 | Nishimura . | |
| 4,163,323 | 8/1979 | Bud | 33/780 |
| 4,760,647 | 8/1988 | Gillis | 33/780 |

FOREIGN PATENT DOCUMENTS

| | | | |
|---|---|---|---|
| 2751620 | 5/1978 | Fed. Rep. of Germany | 33/780 |
| 0036901 | 2/1985 | Japan | 33/779 |
| 61-149801 | 7/1986 | Japan . | |
| 61-169710 | 7/1986 | Japan . | |

*Primary Examiner*—William A. Cuchlinski, Jr.
*Assistant Examiner*—William C. Dowling
*Attorney, Agent, or Firm*—Frishauf, Holtz, Goodman & Woodward

[57] ABSTRACT

A first wheel mechanism and rotation detecting means for detecting rotation of the first wheel mechanism are provided within a casing. A second wheel mechanism for measurement is movable provided at the casing. The second wheel mechanism is located in a non-detecting mode at such a place as not to protrude outside the casing. When moved by a moving member, however, the second wheel mechanism partially protrudes from the casing and the rotation of the second wheel mechanism can be transmitted to the first wheel mechanism, whereby the rotation of the second wheel mechanism can be detected by the rotation detecting means.

22 Claims, 6 Drawing Sheets

ROTATION DETECTING APPARATUS

BACKGROUND OF THE INVENTION

1. Field of the Invention

The present invention relates to a rotation detecting apparatus for use in a length measuring apparatus for measuring the length of an object or length between two points, or a distance measure for measuring the distance between two points on a map.

2. Description of the Related Art

An apparatus is known which rotates a rotational disc along a line connecting two points and detects the amount of rotation of the disc to thereby measure the distance or length between the two points. Such a measuring apparatus is disclosed in, for example, Japanese Patent Disclosure Nos. 61-16970 and 61-149801. U.S. Pat. No. 3,999,298 discloses such a measuring apparatus assembled in a wrist watch.

This sort of measuring apparatus is designed in a such a manner that part of the rotational disc disposed in a casing is exposed and, when the exposed part is pressed against and rolled on a map, for example, the disc's rotation is transmitted through a plurality of transmission gears to a rotational member provided within the casing. Therefore, the length or distance between any two points on the map can be measured by detecting the amount of rotation of the rotational member.

According to such a measuring apparatus, since the rotational disc always engages the transmission gears, the apparatus is likely to easily function even when unintended, thus resulting in undesirable malfunction. In addition, since the rotational disc is always partially exposed from the casing, the disc itself may easily be damaged.

SUMMARY OF THE INVENTION

Accordingly, it is an object of this invention to provide a reliable rotation detecting apparatus which prevents a measuring disc and transmission gears from being damaged or malfunctioning.

To achieve the object, there is provided a rotation detecting apparatus which comprises:
- a casing;
- a first wheel mechanism disposed inside the casing;
  rotation detecting means for detecting rotation of the first wheel mechanism;
- a second wheel mechanism for measurement disposed at the casing such that a periphery of the second wheel mechanism doe not protrude from an outer surface of the casing; and
- a moving member for moving the second wheel mechanism to such a location that rotation thereof is transmitted to the first wheel mechanism and part of the second wheel mechanism is exposed from the outer surface of the casing.

With the above arrangement, when the second wheel mechanism, which does not normally protrude outside the casing, is moved to a specific position, it is coupled to the first wheel mechanism and partially protrudes from the outer surface of the casing to be ready for measurement. This can prevent the second wheel mechanism from being damaged or malfunctioning.

DETAILED DESCRIPTION OF THE PREFERRED EMBODIMENT

A preferred embodiment of this invention as applied to an electronic wrist watch will now be described referring to FIGS. 1 through 10.

Figure 1:
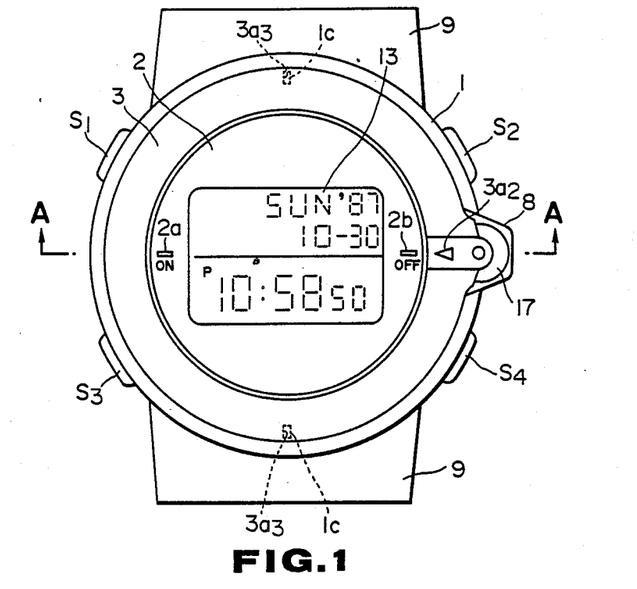
FIG. 1 is a front view of an electronic wrist watch equipped with a rotation detecting apparatus of this invention.
Figure 2:
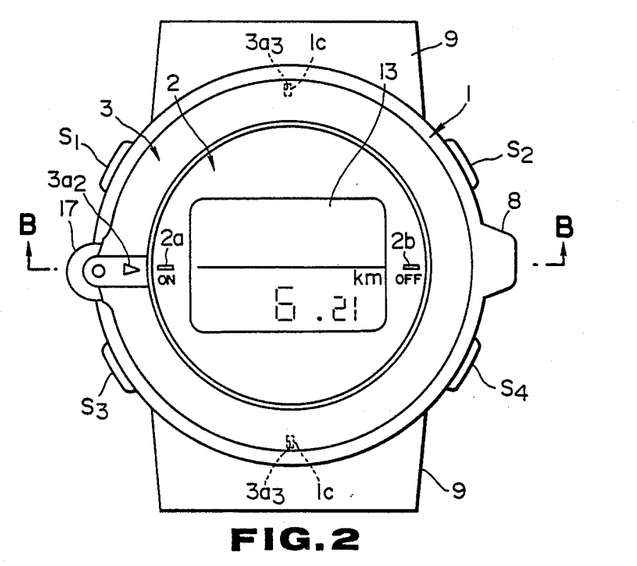
FIG. 2 is a front view of the rotation detecting apparatus of the electronic wrist watch of FIG. 1 in use.
Figure 3:
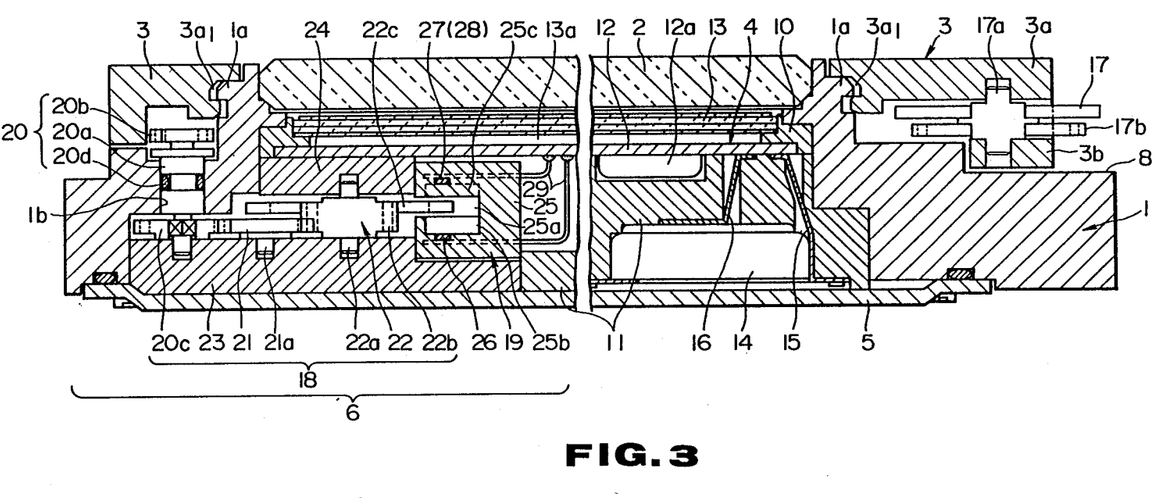
FIG. 3 is a cross-sectional view of the wrist watch as taken along the line A—A in FIG. 1.
Figure 4:
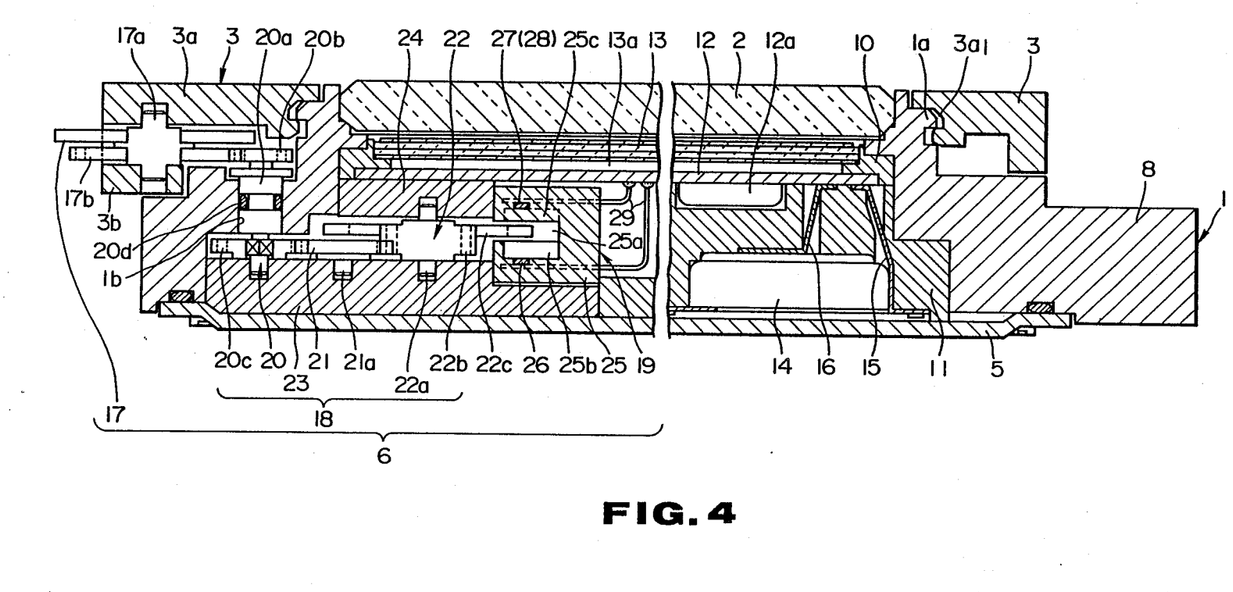
FIG. 4 is a cross-sectional view of the wrist watch as taken along the line B—B in FIG. 2.

FIG. 1 illustrates the front of an electronic wrist watch equipped with a distance measure not in use, and FIG. 2 illustrates the front of the wrist watch with the distance measure in use. FIG. 3 is a cross section of the wrist watch of FIG. 1 as taken along the line A—A illustrating the internal structure thereof, and FIG. 4 is a cross section of the wrist watch as taken along the line B—B in FIG. 2 also illustrating the internal structure. Referring to these diagrams, reference numeral 1 denotes a watch casing which has a watch glass 2 mounted on the top thereof at the center. A rotational bezel 3 is rotatably mounted around the periphery of the top of the casing 1, and a back lid 5 is attached to the bottom thereof, with a watch module 4 disposed inside the casing 1. A rotation detecting apparatus 6 comprising a rotation detecting section 19, a gear train mechanism 18 and a measuring wheel 17 is provided over the region extending from inside the watch casing 1 to the outside thereof. The side walls of the watch casing 1 are provided with various button switches $S_1$–$S_4$ used for mode changing, time correction, etc. A protecting section 8 is integrally and protrusively formed on the right side wall of the watch casing 1. Band attachments 9 are integrally formed on the front and rear walls of the watch casing 1.

The watch module 4, the main part of the watch, has a circuit board 12 provided between a top housing 10 and a bottom housing 11. Above the circuit board 12 is a liquid crystal display panel being electrically coupled to an interconnector 13a. The interconnector 13a electrically connects electrode terminals (not shown) of the circuit board 12 and electrode terminals (also not shown) of the display panel 13. An IC chip 12a is disposed at the bottom of the circuit board 12. A battery 14 is disposed, pressed by a positive (+) electrode plate 15, in the bottom housing 11. This battery 14 is electrically coupled to the circuit board 12 by means of the positive electrode plate 15 and a negative (−) electrode plate 16.

The display panel 13 electro-optically displays time data, distance data, etc.

The bezel 3 comprises a bezel body 3a and an attachment member 3b between which the measuring wheel 17 of the rotation detecting apparatus 6 (to be described later) is rotatably mounted. The bezel body 3a is a ring-shaped flat plate having an engaging section $3a_1$ formed at the inner wall. The engaging section $3a_1$ is rotatably engaged with an engaging section 1a formed at the periphery of the top section of the watch casing 1. The attachment member 3b, serving to rotatably connect the measuring wheel 17 to bezel body 3a, is located where the measuring wheel 17 is provided, and is fixed to the bezel body 3a by ultrasonic welding, with a rotational shaft 17a being mounted on the wheel 17. An alignment mark $3a_2$ is provided on the top of the bezel body 3a in such a manner that matching the mark $3a_2$ with the ON/OFF marks 2a and 2b printed on the watch glass 2 renders the watch to be usable or unusable as a map measure. An alignment recess $3a_3$ is provided at the bottom of the bezel body 3a, and it is designed in such a manner that every time the bezel 3 rotates 180 degrees between the ON/OFF marks 2a and 2b, the recess $3a_3$ engages an alignment projection 1c with a click so as to inhibit the bezel 3 from rotating over 180 degrees.

The rotation detecting apparatus 6, constituting a distance measure, comprises the measuring wheel 17 that rolls on a map, the gear train mechanism 18 that operates with the rotation of the wheel 17, and the rotation detecting section 19 that detects the rotation of the mechanism 18. The measuring wheel 17, which moves together with the bezel 3, is integrally attached to the rotational shaft 17a that is rotatably coupled between the bezel body 3a and the attachment member 3b. This shaft 17a is attached with a drive gear 17b which rotates together with the measuring wheel 17. As shown in FIGS. 1 and 3, this wheel 17, partially protruding outside the bezel 3, is disposed, when not in use, above the protecting section 8 formed on the right wall of the watch casing 1 and is protected by the section 8 so as not to protrude farther than the periphery thereof. The measuring wheel 17, when in use, moves 180 degrees together with the bezel 3 to come to the left side of the watch casing 1, so that the wheel 17 partially protrudes outside the watch casing 1 and the drive gear 17b disengageably engages an outer transmission gear 20b of the gear train mechanism 18 (see FIGS. 2 and 4). The wheel 17 has a circumference of 24 mm and a diameter of 7.64 mm.

Figure 5:
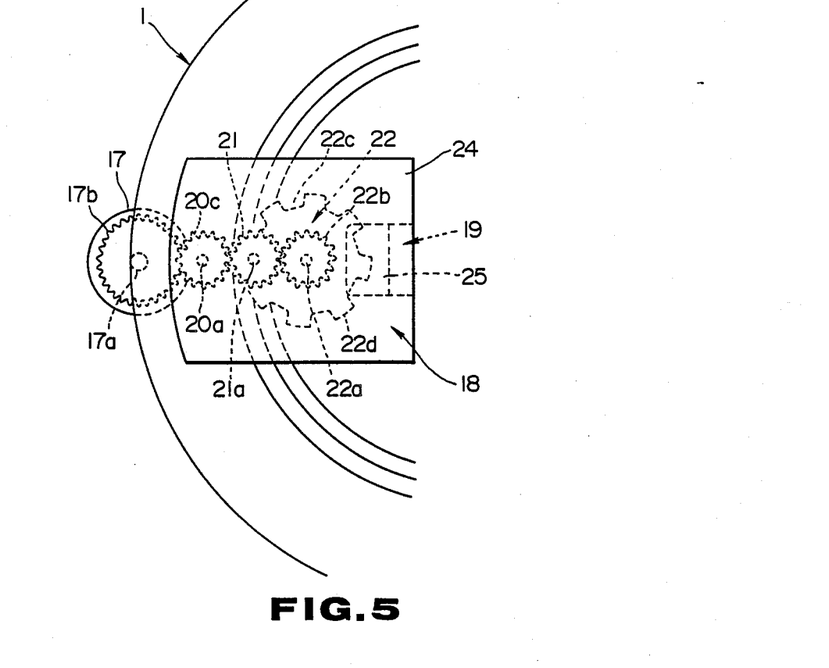
FIG. 5 is a diagram illustrating a gear train mechanism.

As shown in FIGS. 4 and 5, the gear train mechanism 18 comprises a transmission wheel 20, an intermediate wheel 21 and a detection wheel 22, which are rotated by the measuring wheel 17. The transmission wheel 20, serving to transmit the rotation of the measuring wheel 17 into the watch casing 1, comprises the outer transmission gear 20b provided on the top of the rotational shaft 20a and an internal transmission gear 20c provided at the bottom of the shaft 20a, and is disposed below the bezel 3 at the left side of the watch casing 1. More specifically, the rotational shaft 20a is rotatably fitted via a water-proof ring 20d in a through hole 1b, formed at the left side of the watch casing 1, and it has its upper end protruding outside the casing 1 and its lower end extending inside the casing 1 and pivoted in a lower gear train rest 23. The drive gear 17b of the measuring wheel 17 disengageably engages the outer transmission gear 20b, and its gear ratio is set to $\frac{1}{3}$ (e.g., the gear 20b having 10 teeth with respect to the gear 17b having 30 teeth) so that the gear 20b rotates three times for each rotation of the gear 17b. The internal transmission gear 20c rotates with the outer transmission gear 20b via the shaft 20a. The intermediate wheel 21 serves to transmit the rotation of the internal transmission gear 20c to the detection wheel 22, and it always engages the gear 20c with its shaft 21a rotatably supported in the lower gear train rest 23. The detection wheel 22 is rotated by the intermediate wheel 21 and is designed in such a manner that a driven gear 22b and a detection gear 22c are mounted to a rotational shaft 22a so as to rotate together with the shaft 22a. The rotational shaft 22a is rotatably disposed between the lower gear train rest 23 and an upper gear train rest 24. The driven gear 22b always engages the intermediate wheel 21. The detection gear 22c has a greater diameter than the driven gear 22b and has a plurality of teeth 22d (8 teeth in this embodiment) formed around its periphery. The detection gear 22c rotates three times for each rotation of the measuring wheel 17. In other words, the internal transmission gear 20c, intermediate wheel 21 and driven gear 22b have the same number of teeth (16 teeth in this embodiment).

Figure 6:
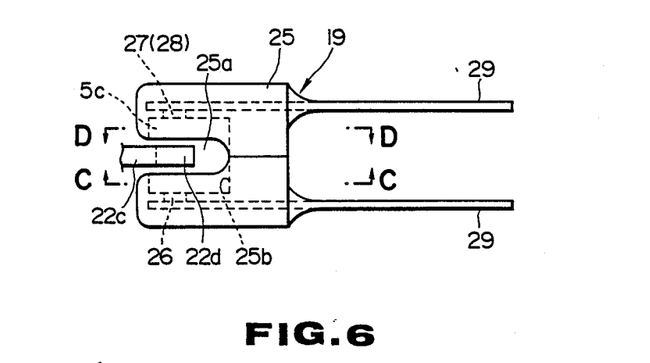
FIG. 6 is a diagram illustrating a rotation detecting section.
Figure 7:
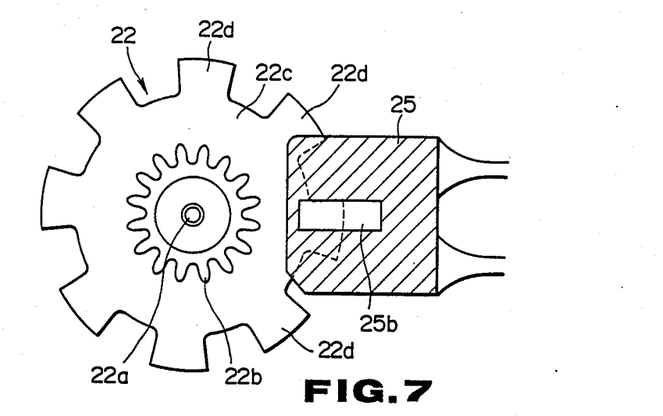
FIG. 7 is a cross-sectional view of the rotation detecting section as taken along the line C—C in FIG. 6.
Figure 8:
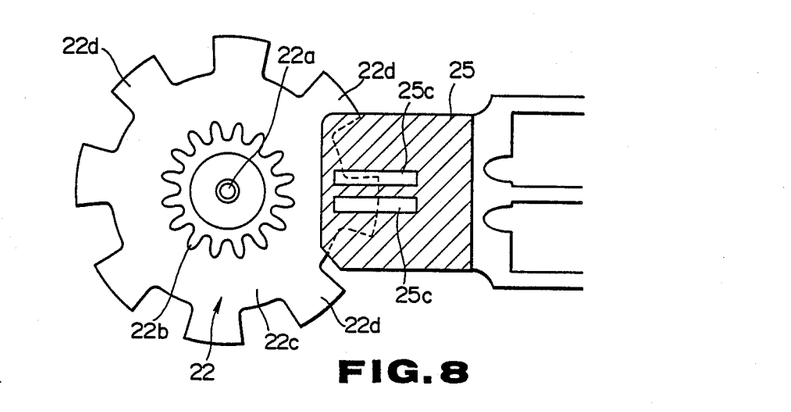
( FIG. 8 is a cross-sectional view as taken along the line D—D in FIG. 6.
Figure 9:
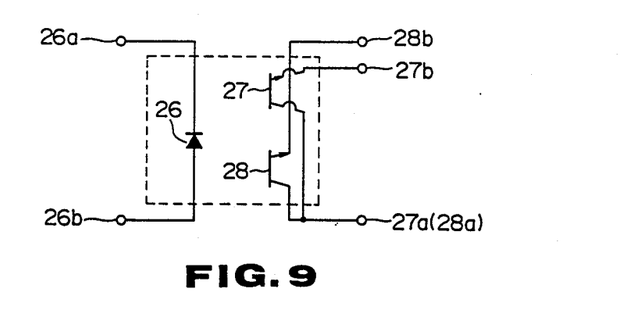
FIG. 9 is a diagram illustrating the structure of the rotation detecting section shown in FIG. 3.

The rotation detection section 19, which detects the number of rotation and the rotating direction of the detection gear 22c, comprises a holding member 25 extending over the upper and lower gear train rests 23 and 24 and having a U-shaped cross section, one light emitting diode 26 and two phototransistors 27 and 28. The diode 26 and phototransistors 27 and 28 are embedded in the holding member 25, the former facing the latter, and these three elements are coupled by lead wires 29 to the circuit board 12 of the time module 4. The holding member 25 is made of a synthetic resin such as an epoxy resin, and has a U-shaped recess 25a into which the detection gear 22c is partially inserted as shown in FIG. 6. Formed at the bottom portion of the holding member 25 is an elongated rectangular opening 25b (see FIG. 7) at the bottom of which the light emitting diode 26 is embedded. As shown in FIG. 8, two slit-shaped light penetrating windows 25c are formed in the upper portion of the holding member 25 which faces the diode 26, and the phototransistors 27 and 28 are respectively embedded in the windows 25c. The light penetrating windows 25c, which are formed by mixing a visible ray dye in the epoxy resin of the holding member 25, absorb visible rays and pass only infrared rays. The light emitting diode 26 emits infrared rays in a distance measure mode (measuring mode). When the infrared rays pass through the opening 25b of the holding member 25 and pass between the teeth 22d of the detection gear 22c, they are irradiated through the two light penetrating windows 25c onto the individual phototransistors 27 and 28. Upon reception of the infrared rays, the phototransistors 27 and 28 generate a high-level electric signal (electromotive force). The light emitting diode 26 and phototransistors 27 and 28 have the circuit configuration as shown in FIG. 9. When a voltage is applied to electrode terminals 26a and 26b of the diode 26, the diode emits an infrared ray. The phototransistors 27 and 28 have input terminals 27a and 28a coupled together and free output terminals, and output high-level electric signals from their output terminals 27b and 28b upon reception of the infrared ray. The rotation detecting section 19 detects the number of rotation of the detection gear 22c by counting the pulse signals from the output terminals 27b and 28b, and discriminates whether the detection gear 22c are rotating in the forward direction or reverse direction by discriminating which pulse signal from the phototransistor 27 or 28 becomes a high level first.

Figure 10:
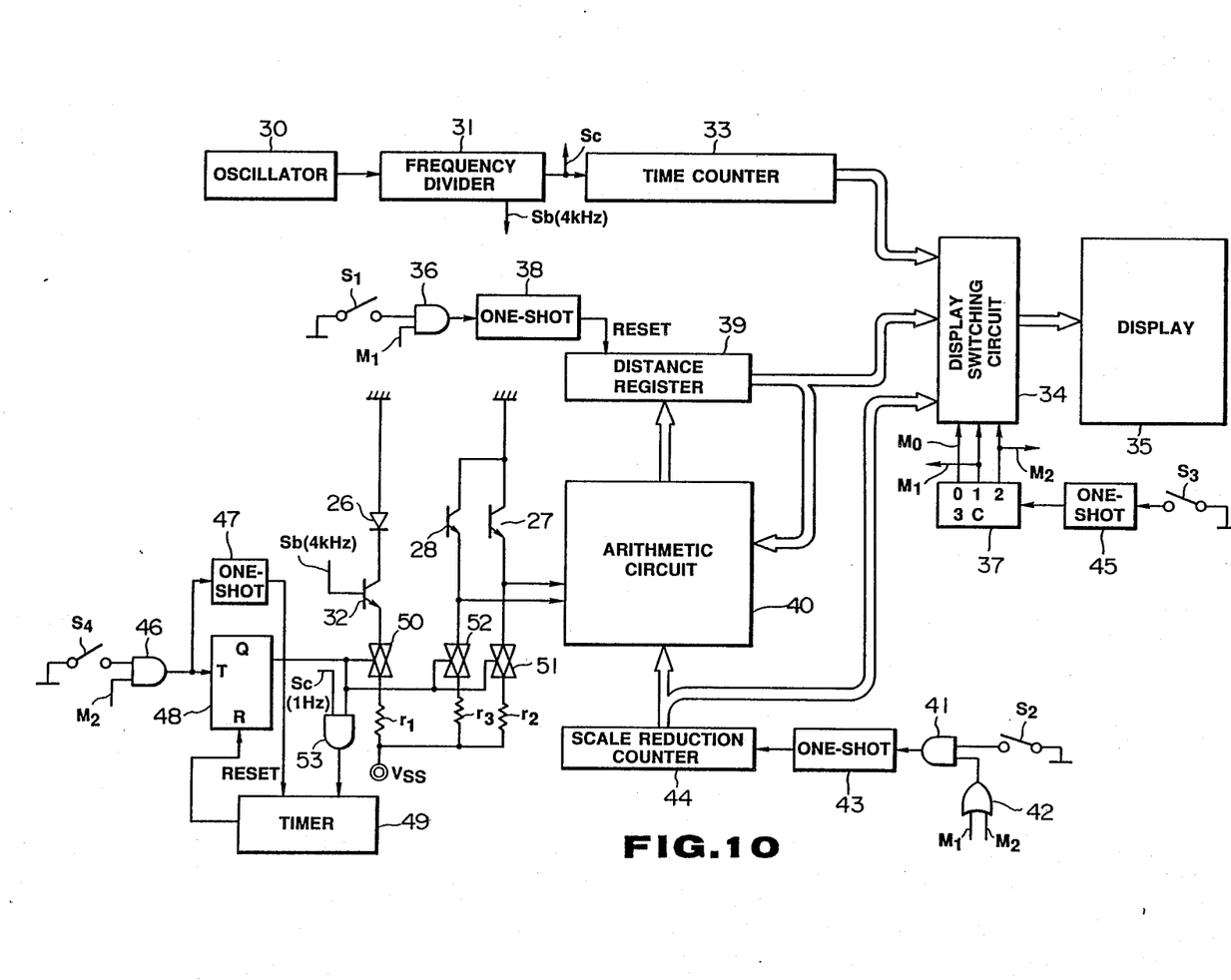
FIG. 10 is a diagram illustrating the circuit configuration of the electronic wrist watch as shown in FIG. 1.

FIG. 10 illustrates the circuit configuration of the electronic wrist watch according to this embodiment.

An oscillator 30 oscillates a reference signal (32768 Hz) and sends the signal to a frequency divider 31. The frequency divider 31 subjects the received reference signal to frequency division, and sends a 4-KHx signal Sb to the base of a switching transistor 32 and a 1-Hz signal Sc to a time counter 33 as well as one input terminal of an AND gate 53.

The time counter 33 counts the 1-Hz signal Sc from the frequency divider 31 to acquire present time data and date data and sends these data through a display switching circuit 34 to a display 35. A reset switch $S_1$ is for resetting the memory content of a distance register 39 which will be described in a later section, and has its one terminal grounded and the other terminal coupled to one input of an AND gate 36. The other input terminal of the AND gate 36 is supplied with a mode signal $M_1$ from a ternary counter 37 (which will be described later).

The AND gate 36 sends the reset signal to a one-shot circuit 38 only upon reception of the signal from the reset switch $S_1$ and the mode signal $M_1$ from the ternary counter 37 simultaneously.

Upon reception of the reset signal, the one-shot circuit 38 sends a reset signal (one-shot pulse) to the distance register 39.

Upon reception of this reset signal from the one-shot circuit 38, the distance register 39 is reset to be in the initial state (no data being registered). The distance register 39 sends its content, distance data, to the display switching circuit 34, and the display 35 displays the data from this circuit 34.

A scale reduction change switch $S_2$ has one terminal grounded and the other terminal coupled to one input of an AND gate 41. The AND gate 41 has the other input terminal coupled to the output terminal of an OR gate 42 and thus supplied with an output signal of the OR gate 42.

The OR gate 42 has two input terminals respectively supplied with mode signals $M_1$ and $M_2$ from the ternary counter 37 (which will be described later).

The AND gate 41 sends its output signal to a one-shot circuit 43 only upon simultaneously receiving the output signal from the OR gate 42 and the signal from the reduction scale change switch $S_2$. Upon reception of the signal, the one-shot circuit 43 sends a scale reduction change signal (one-shot pulse) to a scale reduction counter 44. This counter 44, which is a ternary counter, sequentially counts a signal of "0," "1" or "2" upon each reception of the one-shot pulse (scale reduction change signal) and sends, to an arithmetic unit 40 and the display switching circuit 34, scale reduction data indicating a 1/10000 reduction for the "0" signal, a 1/20000 reduction for the "1" signal or a 1/40000 reduction for the "2" signal.

A display change switch $S_3$ has terminal end grounded and the other terminal coupled to a one-shot circuit 45. When receiving a signal from the display change switch $S_3$, the one-shot circuit 45 sends a display change signal (one-shot pulse) to the ternary counter 37, which sequentially outputs three kinds of display mode signals $M_0$, $M_1$, $M_2$, $M_0$, ... upon each reception of the signal from the one-shot circuit 45. The time mode signal $M_0$ represents a time display, the scale reduction mode signal $M_1$ a scale reduction display, and the distance measure mode signal $M_2$ a distance display.

The ternary counter 37 sends the above mode signals to the display switching circuit 34. This circuit 34 selects the mode to cause the display 35 to display the time data supplied from the time counter 33 upon reception of the time mode signal $M_0$ from the ternary counter 37, or cause the display 35 to display the scale reduction data from the scale reduction counter 44 upon reception of the scale reduction mode signal $M_1$, or cause the display 35 to display the distance data from the distance register 39 upon reception of the distance measure mode signal $M_2$. The ternary counter 37 also sends the scale reduction mode signal $M_1$ to one input terminal of the AND gate 36 coupled to the reset switch $S_1$ as well as to one input terminal of the OR gate 42. Further, the ternary counter 37 sends the distance measure mode signal $M_2$ to one input terminal of an AND gate 46 coupled to a control switch $S_4$ as well as to the other input terminal of the OR gate 42.

The control switch $S_4$ has one terminal grounded and the other terminal coupled to the other input terminal of the AND gate 46.

The AND gate 46 has its output terminal coupled to a one-shot circuit 47 and an input terminal T of a T flip-flop circuit (hereinafter referred to as T-FF circuit) 48. Upon simultaneously receiving a signal from the control switch $S_4$ and the distance measure mode signal $M_2$ from the ternary counter 37, the AND gate 46 sends a high-level signal the one-shot circuit 47 and the input terminal T of the T-FF circuit 48.

Upon reception of this high-level signal, the one-shot circuit 47 sends a reset signal to a timer 41. Upon reception of the high-level signal at the input terminal T, the T-FF circuit 48 outputs a high-level signal from its output terminal Q to the gates of transfer gates 50, 51 and 52. Upon reception of the high-level signal, each transfer gate 50, 51 or 52 connects its input terminal and output terminal to be electrically conductive. The output signal from the output terminal Q of the T-FF circuit 48 is supplied to one input terminal of an AND gate 53 which has the other input terminal supplied with the 1-Hz signal Sc from the frequency divider 31. While receiving the high-level signal from the output terminal Q of the T-FF circuit 48, the AND gate 53 keeps sending the Hz signal Sc to the timer 49. The timer 49 counts the 1-Hz signal Sc to measure the time and sends a reset signal to the reset terminal of the T-FF circuit 48 when a predetermined time, for example, 10 minutes, elapses. Upon reception of the reset signal from the timer 49, the T-FF circuit 48 renders the output signal at the output terminal Q to have a low level.

The transfer gate 50 has its input terminal coupled to the emitter terminal of the switching transistor 32, its output terminal coupled through a resistor $r_1$ to a negative power source $V_{SS}$ and its gate coupled to the output terminal Q of the T-FF circuit 48.

The switching transistor 32 has its base supplied with the 4-KHz signal Sb from the frequency divider 31, and its collector coupled to the cathode terminal of the light emitting diode 26 whose anode terminal is grounded.

The transfer gates 51 and 52 have their input terminals coupled to the emitters of the respective phototransistors 27 and 28 and input terminals of the arithmetic unit 40; the collectors of these phototransistors are grounded. The transfer gates 51 and 52 have their output terminals coupled through respective resistors $r_2$ and r₃ to the negative power source $V_{SS}$ and their gates coupled to the output terminal Q of the T-FF circuit 48.

The phototransistors 27 and 28 send high-level signals to the arithmetic unit 40 while receiving the light from the light emitting diode 26 and low-level signals to the unit 40 while not receiving this light.

Based on pulse signals sent from the phototransistors 27 and 28 when the phototransistors intermittently receive the light from the diode 26, the arithmetic unit 40 computes distance data from the scale reduction data supplied from the scale reduction counter 44 and sends the computed data to the distance register 39.

A description will be given of how to use the electronic wrist watch having the above arrangement.

In a case where the wrist watch is used as a watch, the alignment mark $3a_2$ provided on the top surface of the bezel 3 is aligned with the OFF mark 2b printed on the watch glass 2 as shown in FIG. 1, and in this state the display change switch S₃ is operated to set the mode to the time mode. As a result, the present time, day of a week, month, day, year, etc. are displayed on the liquid crystal display panel 13 of the display 35 as shown in FIG. 1 so that this watch can be used as an ordinary wrist watch. In this case, since the measuring wheel 17 is not engaged with the transmission wheel 20 of the gear train mechanism 18, the wheel 17 is prevented from functioning on its own. Since the measuring wheel 17 is located above the protecting section 8 formed at the watch casing 1 and does not protrude from this section 8 as shown in FIG. 3, the wheel can be protected against damage by the section 8. Therefore, the watch can well serve as a wrist watch.

In a case where the watch is used as a map measure, the bezel 3 is rotated 180 degrees so that the alignment mark $3a_2$ on the bezel 3 is aligned with the ON mark 2a printed on the watch glass 2. Consequently, the drive gear 17b of the measuring wheel 17 is engaged with the outer transmission gear 20b of the transmission wheel 20 and the wheel 17 partially protrudes from the watch casing 1. Thereafter, the scale reduction data is set, followed by the distance measuring operation.

To set the scale reduction data from the time display mode, first, the display change switch S₃ is operated once. This switch operation causes the one shot circuit 45 to send the display change signal (one-shot pulse) to the ternary counter 37. In the time display mode, the ternary counter 37 sends the time mode signal M₀ to the display switching circuit 34 so that this circuit 34 selects the time display mode. When the one-shot pulse is sent once to the ternary counter 37, however, this counter sends the scale reduction mode signal M₁ to the display switching circuit 34 so that this circuit 34 selects the scale reduction data from the scale reduction counter 44 and causes the display 35 to display the selected data.

There are three types of scale reduction data in this embodiment, which respectively indicate 1/10000 reduction, 1/20000 reduction and 1/40000 reduction and one of which is displayed on the display 35 by operating the scale reduction change switch S₂ (the display of the scale reduction data being not illustrated). While viewing the display 35, an operator operates the switch S₂ to select the proper scale reduction data for the reduced scale of a map to be measured. When the desired scale reduction data, for example, 1/20000, is displayed on the display 35, the operator operates the reset switch S₁ once to reset the content of the distance register 31, and then operates the display change switch S₃ again to proceed to the distance measuring operation. When the switch S₃ is operated once, the one-shot circuit 45 sends the display change signal (one-shot pulse) to the ternary counter 37 which in turn sends the distance measure mode signal M₂ to the display switching circuit 34. As a result, the circuit 34 causes the display 35 to display the data from the distance register 39. At this time, since the distance data in the register 39 is reset, "00.00" will be displayed on the lower right portion of the display panel 13 though not illustrated.

When the operator operates the control switch S₄ in the above state, the AND gate 46 outputs a high-level signal since the distance measure mode signal M₂ has already been supplied to one of the input terminals of the AND gate 46, and sends this high-level signal to the one-shot circuit 47 and the input terminal T of the T-FF circuit 48. Upon reception of the high-level signal from the AND gate 46, the one-shot circuit 47 sends a one-shot pulse to the timer 49 to reset it. Upon reception of the high-level signal from the AND gate 46 at the input terminal T, the T-FF circuit 48 sends a high-level signal from the output terminal Q to the gate terminals of the transfer gates 50-52 and one of the input terminals of the AND gate 53. Upon reception of the high-level signal from the output terminal Q of the T-FF circuit 48, each transfer gate 50, 51 or 52 connects its own input terminal and output terminal. Accordingly, the transfer gate 50 supplies power to the light emitting diode 26 through the switching transistor 32, and the transfer gates 51 and 52 supply power to the phototransistors 27 and 28. Consequently, the diode 26 and phototransistors 27 and 28 start functioning.

Under the above condition, with the watch casing 1 set upright, the measuring wheel 17 partially protruding from the casing 1 is directly pressed against the map and is rolled thereon. The rotation of the measuring wheel 17 rotates the drive gear 17b, thereby rotating the outer transmission gear 20b of the transmission wheel 20. In this case, since the gear ratio of the outer transmission gear 20b to the gear 17b is ⅓, the gear 20b rotates three times for each rotation of the measuring wheel 17. In this manner, the rotation of the outer transmission gear 20b is transmitted via the rotational shaft 20a of the transmission wheel 20 to the internal transmission gear 20c within the watch casing 1 and the rotation of the gear 20c is transmitted via the intermediate wheel 21 to the driven gear 22b of the detection wheel 22c, thus rotating the detection gear 22c. Since the internal transmission gear 20c of the transmission wheel 20, the intermediate wheel 21 and the driven gear 22b of the detection wheel 22 have the same number of teeth, the detection gear 22c rotates three times for each rotation of the measuring wheel 17. As the detection gear 22c rotates, the infrared rays emitted from the light emitting diode 26, which are irradiated on the gear 22c through the opening 25b, are irradiated on the phototransistors 27 and 28 through the light penetrating windows 25c above when the intervals between the teeth 22d of the gear 22c come above the phototransistors 27 and 28. Upon reception of the infrared rays, the phototransistors 27 and 28 output high-level signals. Accordingly, while the detection gear 22c is rotating, the phototransistors 27 and 28 output pulse signals which are counted by the arithmetic unit 40.

Consequently, the number of rotation of the detection gear 22c is detected and the number of rotation of the measuring wheel 17 can be found on the basis of the detected number of rotation. More specifically, when the numbers of the pulses from the phototransistors 27 and 28 counted are equal to a predetermined number (the number of teeth 22d of the detection gear 22c; eight in this embodiment), it is detected that the detection gear 22c has rotated once, from which it is found that the measuring wheel 17 has made ⅛ of its rotation. The arithmetic unit 40 acquires distance data from the numbers of the counted pulses from the phototransistors 27 and 28 and the scale reduction data from the scale reduction counter 44, and stores the acquired data in the distance register 39. The distance data in this register 39 is displayed on the display panel 13 of the display 35. (The displayed distance data is "6.21 km" in FIG. 2.) In this case, the forward rotation or reverse rotation of the detection wheel 22 is discriminated depending on which pulse signal from the phototransistor 27 or 28 becomes a high level first. Therefore, when the measuring wheel 17 is rolled beyond a specific position on the map and is then returned to the position, for example, this event is discriminated by the phototransistors 27 and 28 and the number of counts corresponding to the amount of the returned distance is subtracted from the actual number of counts for compensation for the over rolling of the wheel 17.

Since the high-level signal from the output terminal Q of the T-FF circuit 48 is supplied to one input terminal of the AND gate 53 and when 1-Hz signal Sc is supplied to the other input terminal thereof, the AND gate 53 sends this signal Sc to the timer 49.

Upon reception of the 1-Hz signal, the timer 49 counts this signal and sends a reset signal to the reset terminal R of the T-FF circuit 48 when the count coincides with the preset value stored in the timer 49. When receiving the reset signal at its reset terminal R, the T-FF circuit 48 renders the output signal from the output terminal Q to have a low level. When the low-level signal is supplied to the transfer gates 50-52 and AND gate 53, each transfer gate disconnects the connection between its input terminal and output terminal. As the transfer gate 50 makes the disconnection, the supply of power from the negative power source $V_{SS}$ through the resistor $r_1$, transfer gate 50 and switching transistor 32 is stopped and the light emitting diode stops the light emission. When the transfer gates 51 and 52 similarly each make the disconnection between the input terminal and output terminal, the supply of power from the power source $V_{SS}$ through the resistor $r_2$ and the transfer gate 51 and through the resistor $r_3$ and the transfer gate 52 is stopped. This stops the operation of the phototransistors 27 and 28. Further, since the low-level signal is supplied to one input terminal of the AND gate 53, the output signal of the gate 53 becomes a low-level signal and the timer 49 stops the counting operation.

When the control switch $S_4$ is operated during the counting operation of the timer 49, the AND gate 46 sends its high-level output signal to the input terminal T of the T-FF circuit 48 and the one-shot circuit 47. When receiving the high-level signal at its input terminal T at this point, the T-FF circuit 48 renders its output at the output terminal Q to be a low-level signal and sends the signal to the transfer gates 50-52 and one input terminal of the AND gate 53. As a result, each transfer gate 50, 51 or 52 disconnects the electric connection between its input terminal and output terminal, so that the light emitting diode 26 and phototransistors 27 and 28 stop functioning. Upon reception of the high-level signal from the AND gate 46, the one-shot circuit 47 sends the one-shot pulse to the timer 49 to reset it.

In short, when the control switch $S_4$ is operation during the counting operation of the timer 49, the operations of the diode 26 and phototransistors 27 and 28 are stopped.

When the control switch $S_4$ is operated after the timer 49 has completed the counting operation and the diode 26 and phototransistors 27 and 28 has stopped their operations, the high-level signal is supplied through the AND gate 46 to the input terminal T of the T-FF circuit 48. Since the low-level signal is output from the output terminal Q of the T-FF circuit 48 at this time, the high-level signal being supplied to the input terminal T renders the output of the output terminal Q to be a high-level signal so that the timer 49, light emitting diode 26 and phototransistors 27 and 28 start operating as described earlier.

Although, according to the above embodiment, the protecting section 8 is provided at the right side of the watch casing 1 to protect the measuring wheel 17, this design may be modified such that the band attachments 9 formed at the front and rear sections of the watch casing 1 serve as the protecting section.

The measuring wheel 17 is provided on the bezel 3 to be able to move in arc according to the above embodiment. This invention is not, however, restricted to such arrangement, but may be modified so that when the measuring wheel 17 linearly slides to come to the position where it can be used as a distance measure, the wheel 17 partially protrudes from the casing 1 and can drive transmission wheel 20, etc. of the gear train mechanism 18.

Although the foregoing description of this embodiment has been given with reference to the present invention being applied to an electronic wrist watch, this invention is in no way restricted to this particular case but may be applied to other electronic devices such as a travel watch and a card type radio.

The application of the present rotation detecting apparatus is not limited to a distance measure for measuring the distance between two points on a map, but the apparatus may be modified to measure the moving speed, rotational speed, the number of rotation, etc.

What is claimed is:

1. A rotation detecting apparatus comprising:
a casing;
a first wheel mechanism disposed inside said casing;
rotation detecting means for detecting rotation of said first wheel mechanism;
a second wheel mechanism for measurement disposed at said casing such that a periphery of said second wheel mechanism does not protrude from an outer surface of said casing; and
a moving member for moving said second wheel mechanism to such a location that rotation thereof is transmitted to said first wheel mechanism and part of said second wheel mechanism is exposed from said outer surface of said casing.

2. The apparatus according to claim 1, wherein said first and second wheel mechanisms have a gear wheel.

3. The apparatus according to claim 1, wherein said casing has a through hole formed therein and a third wheel mechanism for transmitting rotation of said second wheel mechanism to said first wheel mechanism is disposed within said through hole.

4. The apparatus according to claim 1, wherein said moving member is rotatably attached to said casing.

5. The apparatus according to claim 1, wherein said rotation detecting means comprises:

a detection element for detecting rotation of said first wheel mechanism;

drive start means for starting driving of said detection element; and drive stop means for stopping driving of said detection element upon elapse of a predetermined time after said driving of said detection element has been started by said drive start means.

6. The apparatus according to claim 1, wherein said first wheel mechanism has a detecting wheel having a notch formed therein, and said rotation detecting means has a light emitting element disposed at one side surface of said detecting wheel and a light receiving element disposed on an opposite side surface thereof in association with said light emitting element, whereby rotation of said first wheel mechanism is detected by detecting that light emitting from said light emitting element onto said light receiving element is shielded by said detecting wheel.

7. A rotation detecting apparatus comprising:
a watch casing having a timing display section provided at a front thereof;
a first wheel mechanism disposed inside said watch casing;
rotation detecting means for detecting rotation of said first wheel mechanism;
a second wheel mechanism for measurement disposed at said watch casing such that a periphery of said second wheel mechanism does not protrude from an outer surface of said watch casing; and
a moving member for moving said second wheel mechanism to such a location that rotation thereof is transmitted to said first wheel mechanism and part of said second wheel mechanism is exposed from said outer surface of said watch casing.

8. The apparatus according to claim 7, wherein said first and second wheel mechanisms have a gear wheel.

9. The apparatus according to claim 7, wherein said watch casing has a through hole formed therein and a third wheel mechanism for transmitting rotation of said second wheel mechanism to said first wheel mechanism is disposed within said through hole.

10. The apparatus according to claim 7, wherein said moving member is rotatably attached to said watch casing.

11. The apparatus according to claim 7, wherein said moving member is a rotational bezel rotatably mounted around said time display section of said watch casing.

12. The apparatus according to claim 7, wherein said rotation detecting means comprises:
a detection element for detecting rotation of said first wheel mechanism;
drive start means for starting driving of said detection element; and
drive stop means for stopping driving of said detection element upon elapse of a predetermined time after said driving of said detection element has been started by said drive start means.

13. The apparatus according to claim 7, wherein said second wheel mechanism has a detecting wheel having a notch formed therein, and said rotation detecting means has a light emitting element disposed at one side surface of said detecting wheel and a light receiving element disposed on an opposite side surface thereof in association with said light emitting element, whereby rotation of said first wheel mechanism is detected by detecting that light emitting from said light emitting element onto said light receiving element is shielded by said detecting wheel.

14. A rotation detecting apparatus comprising:
a casing;
a first wheel mechanism disposed inside said casing;
rotation detecting means for detecting rotation of said first wheel mechanism and outputting a signal for each predetermined rotational angle;
a second wheel mechanism for measurement disposed at said casing such that a periphery of said second wheel mechanism does not protrude from an outer surface of said casing;
a moving member for moving said second wheel mechanism to such a location that rotation thereof is transmitted to said first wheel mechanism and part of said second wheel mechanism is exposed from said outer surface of said casing;
distance data computing means for acquiring data of an amount of rotation of said second wheel mechanism from said signal from said rotation detecting means and providing distance data corresponding to said data of said amount of rotation; and
display means for display said distance data acquired by said distance data computing means.

15. The apparatus according to claim 14, wherein said first and second wheel mechanisms have a gear wheel.

16. The apparatus according to claim 14, wherein said casing has a through hole formed therein and a third wheel mechanism for transmitting rotation of said second wheel mechanism to said first wheel mechanism is disposed within said through hole.

17. The apparatus according to claim 14, wherein said moving member is rotatably attached to said casing.

18. The apparatus according to claim 14, wherein said casing is a watch casing and said moving member is a rotational member rotatably attached to said watch casing.

19. The apparatus according to claim 14, wherein said rotation detecting means comprises:
a detection element for detecting rotation of said first wheel mechanism;
drive start means for starting driving of said detection element; and
drive stop means for stopping driving of said detection element upon elapse of a predetermined time after said driving of said detection element has been started by said drive start means.

20. The apparatus according to claim 14, wherein said second wheel mechanism has a detecting wheel having a notch formed therein, and said rotation detecting means has a light emitting element disposed at one side surface of said detecting wheel and a light receiving element disposed on an opposite side surface thereof in association with said light emitting element, whereby rotation of said first wheel mechanism is detected by detecting that light emitting from said light emitting element onto said light receiving element is shielded by said detecting wheel.

21. The apparatus according to claim 14, further comprising time counting means for acquiring present time data to be displayed on said display means.

22. The apparatus according to claim 14, wherein said distance data computing means has memory means for storing scale reduction data representing an externally specified reduced scale and acquires said distance data from said scale reduction data and said data of said amount of rotation of said second wheel mechanism.

* * * * *